(No Model.)

W. F. GREENE.
STOVE PIPE DAMPER.

No. 304,311. Patented Sept. 2, 1884.

Witnesses:
W. C. Jirdinston
Fred F. Church

Inventor:
William F. Greene
by
Church & Church
his Attorneys.

UNITED STATES PATENT OFFICE.

WILLIAM F. GREENE, OF TROY, NEW YORK.

STOVE-PIPE DAMPER.

SPECIFICATION forming part of Letters Patent No. 304,311, dated September 2, 1884.

Application filed November 6, 1883. (No model.)

*To all whom it may concern:*

Be it known that I, WILLIAM F. GREENE, of Troy, in the county of Rensselaer and State of New York, have invented a certain new and Improved Stove-Pipe Damper; and I do hereby declare the following to be a full, clear, and exact description of the same, reference being had to the accompanying drawings, forming part of this specification, and to the figures and letters of reference marked thereon.

My invention has for its object to provide a damper which can be readily attached to or removed from a stove-pipe by even an unskilled person, and which, when in place in a stove-pipe, will remain in any desired position of adjustment unaffected by the strength of the draft or other like cause.

I will first describe my damper in detail with reference to the accompanying drawings, and then point out what I deem its special features of novelty in the clause of claim at the end of this specification.

Figure 1:
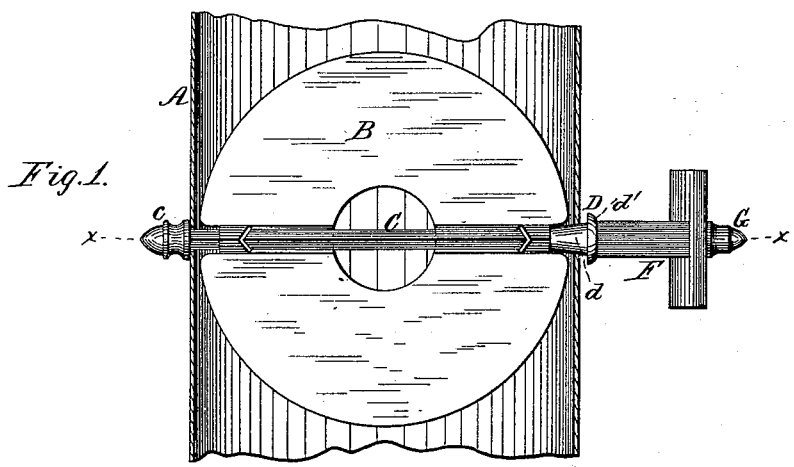
Figure 2:
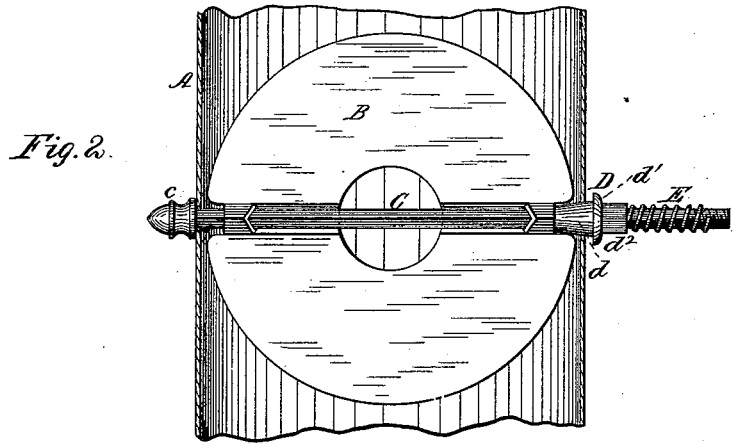
Figure 3:
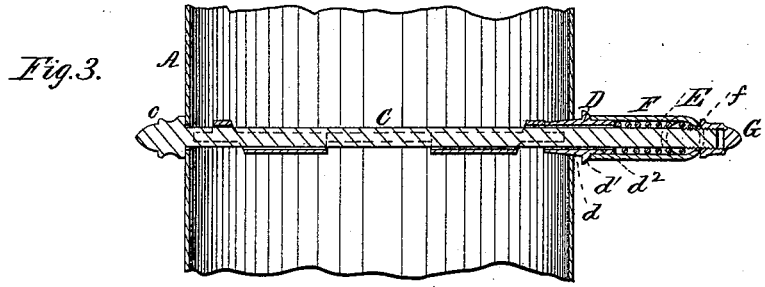

Figure 1 of the drawings represents a side elevation of my improved damper arranged within a stove-pipe; Fig. 2, a similar view of the same with the handle removed, and Fig. 3 is a sectional view taken on the line $x\ x$ of Fig. 1.

Similar letters of reference in the several figures denote the same parts.

The letter A designates the stove-pipe to which my damper is shown applied. The body of the damper or damper proper, B, is placed within the stove-pipe with its rod-openings in line with suitable apertures in opposite sides of the pipe, and the rod C is then thrust through, thus securing the damper upon the rod within the pipe. The rod is squared, as are also the rod-openings in the damper, to prevent the damper turning on the rod; and the rod at one end has cast upon it or secured to it a knob or head, $c$, to prevent it being drawn through the pipe, while at the other end the portion projecting out of the pipe is screw-threaded, as shown. A thimble, D, having an enlarged tapering portion, $d$, terminating at a collar, $d'$, and a squared shank portion, $d^2$, is next slipped upon the threaded end of the rod until its tapering portion $d$ enters and fills the aperture in the stove-pipe, as shown in Fig. 3, after which a spiral spring, E, is also slipped on the rod, followed by the hollow-shanked handle F. The shank of the handle completely incloses the spring and fits over the squared shank $d^2$ of the thimble D, and when the knob $c$ of the rod is held and the handle pressed fully on, the spring is compressed between the thimble-shank and the shoulder $f$ on the handle, while the threaded end of the rod projects through the head of the handle and enables a screw nut or cap, G, to be applied thereto. By adjusting this screw-nut G the tension of the spring can be regulated and the tapered sleeve caused to bind more or less in its seat in the pipe, so that when the damper is turned by means of the handle it will remain just where adjusted until further turned.

Prior to my invention dampers have been constructed having a tapering or cone-shaped bearing pressed in by a spiral spring shouldered against the rod or something attached to the rod; but in such structures the spring has been applied so close to the pipe as to be materially injured by the heat and soon rendered worthless. In my invention it will, however, be observed that the spring is so far removed from the pipe as to be less liable to injury, and, being entirely inclosed by the handle, all interference with its operation is prevented.

The thimble and the shank of the handle may be connected, if desired, so as to reduce the number of separable parts.

Having thus described my invention, I claim as new—

The herein-described stove-pipe damper, consisting of the damper-blade, the rod having the knob on one end and screw-threaded at its other end, the thimble or bearing having the tapering portion and the extended shank, the spiral spring, the handle having the hollow shank inclosing the spring and fitted to the shank of the thimble, and the screw-nut or cap, the whole constructed and arranged substantially as set forth.

WILLIAM F. GREENE.

Witnesses:
 WILLIAM C. BUELL,
 RICHARD J. FANNING.